G. JONES.
CONVEYER FOR COALING SHIPS AND OTHER SUCH PURPOSES.
APPLICATION FILED JAN. 29, 1917.
1,239,400.
Patented Sept. 4, 1917.
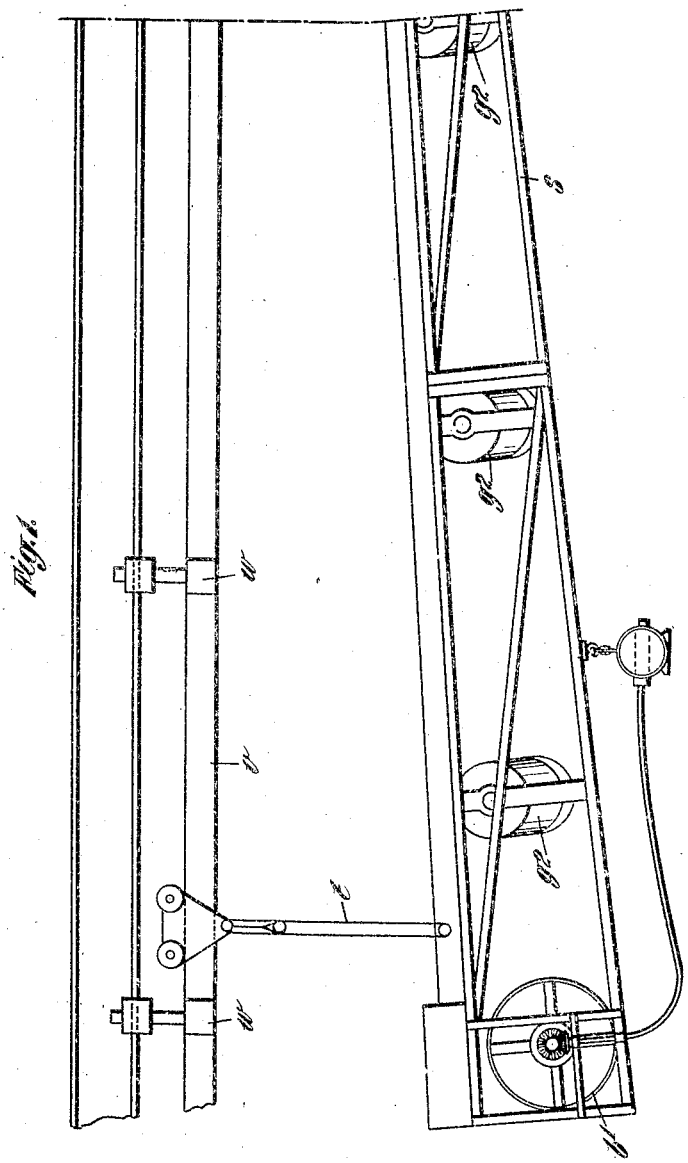
INVENTOR
GEORGE JONES
ATTORNEY G. JONES.
CONVEYER FOR COALING SHIPS AND OTHER SUCH PURPOSES.
APPLICATION FILED JAN. 29, 1917.
1,239,400.
Patented Sept. 4, 1917.
3 SHEETS—SHEET 2.
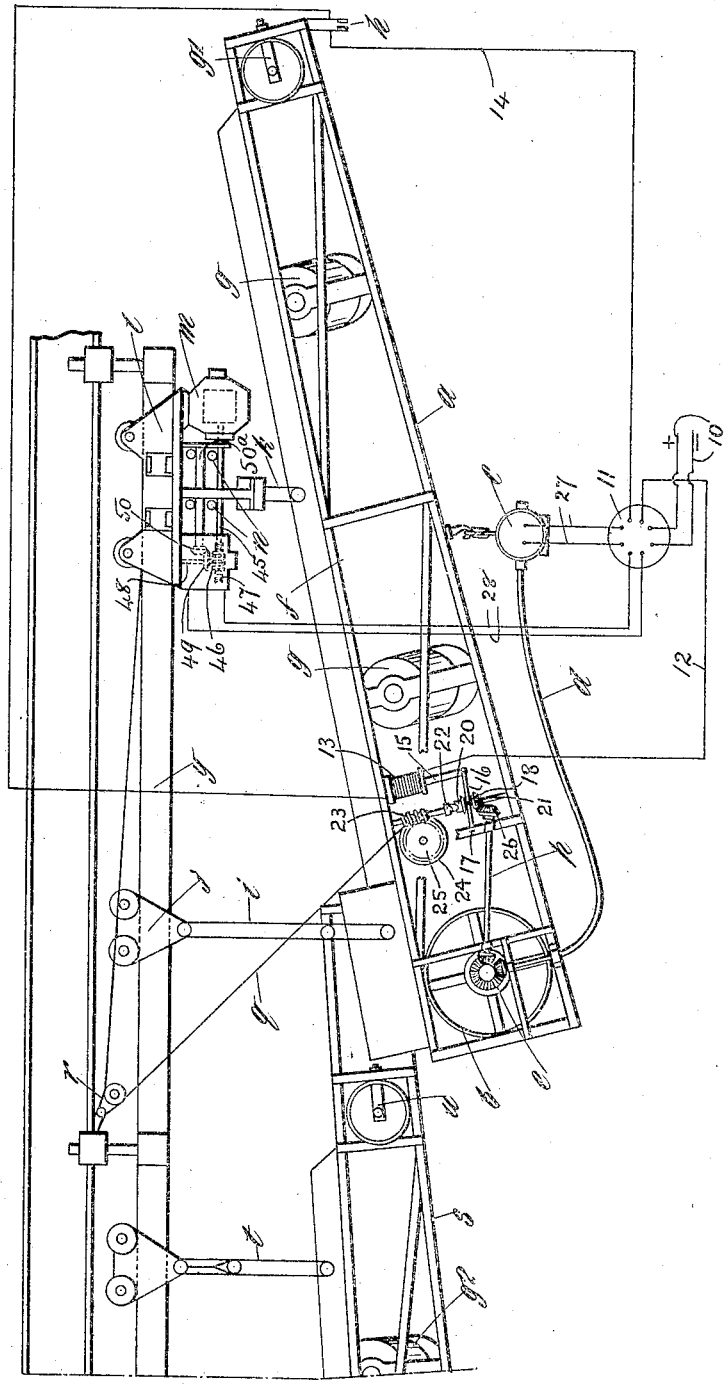

G. JONES.
CONVEYER FOR COALING SHIPS AND OTHER SUCH PURPOSES.
APPLICATION FILED JAN. 29, 1917.
1,239,400.
Patented Sept. 4, 1917.
3 SHEETS—SHEET 3.
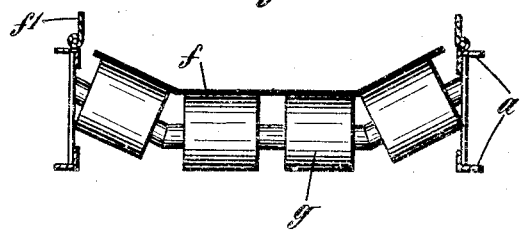
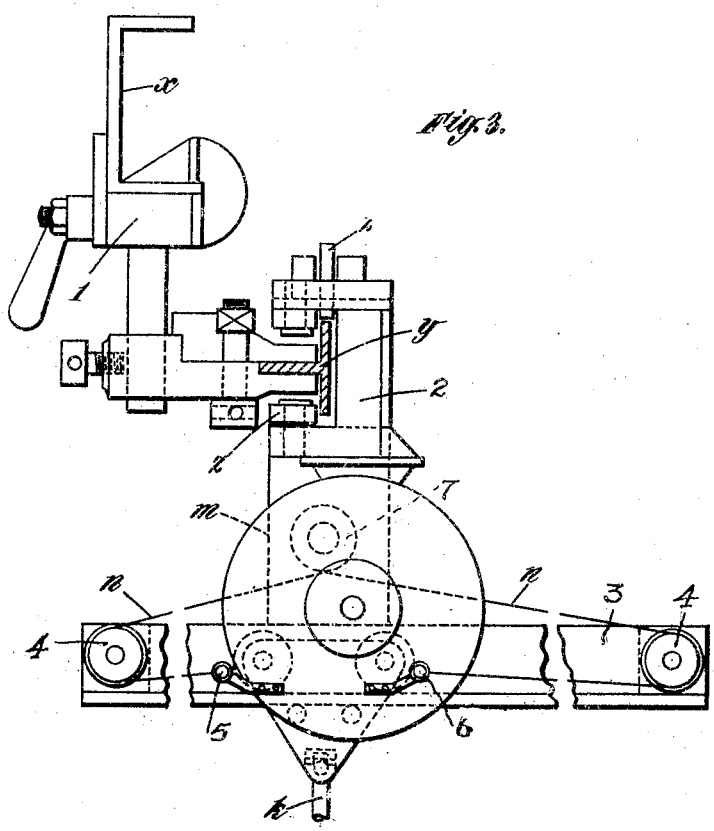
INVENTOR
GEORGE JONES
BY: H van Dedemmel
ATTORNEY.

UNITED STATES PATENT OFFICE.

GEORGE JONES, OF MANOR PARK, ENGLAND.

CONVEYER FOR COALING SHIPS AND OTHER SUCH PURPOSES.

1,239,400.  Specification of Letters Patent.  Patented Sept. 4, 1917.

Application filed January 29, 1917. Serial No. 145,292.

*To all whom it may concern:*

Be it known that I, GEORGE JONES, a citizen of the United Kingdom of Great Britain and Ireland, and resident of 25 Church road, Manor Park, in the county of Essex, England, have invented certain new and useful Improvements in and Relating to Conveyers for Coaling Ships and other Such Purposes, of which the following is a specification, such as will enable others skilled in the art to which it appertains to make and use the same.

This invention relates to conveyers particularly designed for coaling ships, but applicable to other purposes where coal, grain or other substance has to be carried a variable distance and deposited in bunkers or other places, the conveyers being of the kind comprising a framework having suspending means furnished with wheels or rollers so that the conveyer can be moved lengthwise along a girder or equivalent upon which it is suspended.

An object of the invention is to provide conveyers which can be easily and quickly erected even in comparatively narrow passages and around corners and which will deliver the coal or other material in any requisite direction.

A further object is to construct the conveyers so as to automatically alter their position lengthwise and laterally whereby the direction of delivery as the quantity of material already delivered increases, is altered, so that, assuming a bunker is being filled with coal, the conveyer will deposit it say at one end of the bunker, and when this part is sufficiently filled the conveyer will automatically shift while continuing its delivery, so as to deposit the coal in another place.

My improved appliance may be broadly described as consisting of a frame-work in sections each carrying a belt conveyer and adapted to be detachably secured, say, to the structure supporting the deck head.

Each frame also carries an electric motor which drives the belt conveyer. Two of these frames each with its motor and endless conveyer, may be used end to end so as to add to the length of delivery and in such cases the outermost is adapted to travel rearwardly and to push back the other.

This rearward movement is brought about by the growing pile of coal pressing against an electric switch carried by the conveyer and which, when so pressed upon closes a circuit to a clutch connected to winding gear which draws the conveyer rearwardly until the pressure is relieved and the circuit reopened.

The same conveyer is supported toward its outer end by a hanger from which it is swung to and fro through the arc of a circle and thereby caused to deposit the coal over a comparatively wide area. This to and fro motion is accomplished by a self-reversing electric motor carried by the said hanger.

The driving gear is preferably inclosed or so covered in that there is little chance for coal dust or other material getting into the working parts and retarding same.

It will be seen from the above description, that the conveyers are self-contained, and being portable they can be applied in varying numbers to practically all kinds of vessels. The means for attaching and detaching the conveyer is simple and rapid, and for this reason and because the operation of the conveyers is to so great an extent automatic, few men are required while the delivery efficiency is very great.

The means of delivery of coal or other material to the conveyer or conveyers is immaterial, and the supply of electric current may be taken from any convenient source.

An example of my invention is shown in the accompanying drawings, in which Figures 1 and 1ª illustrate a conveyer in two sections attached together end to end; Fig. 2 is a cross sectional view of the foremost (right hand) conveyer shown in Fig. 1; Fig. 3 shows, on enlarged scale, an end view of the supporting tackle for the said foremost conveyer and by which the end of the conveyer is shifted to and fro in lateral direction; Fig. 4 illustrates the gear driven from the reversing motor shown in Fig. 1 on the supporting tackle and illustrates also a switch therefor, the connections to the motor and the motor itself being shown diagrammatically.

The outermost conveyer *a* is provided with belt driving wheel *b*, driven from motor *c*, flexible shaft *d* and gear *e*. The belt *f* travels over idle wheels *g* and an end roller capable of adjustment at *g'* so as to tighten or slacken the belt. This conveyer is suspended by tackle *i* from roller bearing *j* and by sling *k* on the traveling gear *l* to which a self-reversing motor *m* is fitted. This motor draws upon two cables *n*, see Fig. 3, for the purpose of swinging the conveyer to and fro laterally. The forward end of the conveyer carries a compressible contact-switch *h* electrically connected to clutch *o* one member of which is constantly driven from the gear *e* and when the circuit is closed by pressure against the contact *h* the clutch draws upon cable *q* running over pulley *r* and draws the conveyer rearwardly. This rearward movement is imparted to the second conveyer *s* which is suspended by tackle *t* from the girder *y*. This is secured by clamps *w* to the beam *x* in the manner hereinafter described more particularly with reference to Fig. 3. This second conveyer has driving wheel *b'* and rollers $g^2$ the equivalents of *b* and *g* of the conveyer *a*.

Fig. 2 is a cross sectional view of a conveyer such as the foremost shown in Fig. 1 and depicts the arrangement of the rollers *g* of which four in number are shown, the two central rollers being on a horizontal axis and the two outermost on axes inclined upwardly so as to impart a grooved cross sectional formation to the part *f*. The conveyer frame *a* is provided with hinged side pieces *f'* which will prevent the throwing of coal or other material over the side of the conveyer if the belt is traveling very rapidly or is overloaded.

Fig. 3 shows on an enlarged scale the supporting and lifting tackle for the foremost conveyer illustrated in Fig. 1, in which the motor *m* is employed. In this drawing a tackle is secured to the beam *x* by the clamp 1, said clamp being of double formation and adapted to grip the girder *y* upon which the frame 2 having anti-friction rollers *z* is mounted so as to permit longitudinal movement of the device on the girder *y*. This tackle carries a cross-bar 3 upon which idle rollers 4 are mounted. On this cross-bar shackle *k* is mounted and adapted to travel to and fro. The ends of the cable *n* are secured to the shackle support *k* at 5 and 6 the cable being wound around drum 7 driven from the motor *m*. As before mentioned motor *m* is self reversing and is such as will alternately wind the cable in two directions thus drawing the roller support of shackle *k* to and fro along the bar 3, thereby bringing about the to and fro lateral motion of the conveyer *a*.

Referring more particularly to the electrical connections and the shifting gear both for the rearward and for the lateral movements, 10 is the electricity supply main which is carried to box 11, from which a circuit 12 is taken to the coil 13 of a solenoid and to the hanging contact *h* where it is normally broken but upon closing the said contact is returned to the box 11 by the line 14. The core 15 of the coil 13 is, by gravity, normally in its outermost position in relation to the coil 13 as shown in Fig. 1ª, but is drawn therein when the coil is energized. To the end of the core 15 a lever 16 is pivotally attached, said lever being mounted upon a pivot 17 on the frame of the conveyer. The lever 16 is provided with a pin 18 which fits into a groove in one member 20 of a clutch. The member 20 is slidably keyed to the shaft of a pinion 21 and is capable of to and fro movement therealong. The other member 22 of the clutch is fixed to the shaft of worm 23, said shaft being free. The worm 23 is in constant mesh with a worm wheel 24 on the winding drum 25 over which the cable *q* is wound. The pinion 21 is constantly driven by a pinion 26 on the shaft *p* which is rotated by gear *e* from the flexible shaft *d*.

Under normal circumstances the clutch members 20—22 are separated and no motion is conveyed to the member 22 and the worm 23, but when the solenoid is energized through the closing of contact *h* the clutch member 20 is lifted into engagement with the member 22 and rotates it thus driving the worm 23, worm wheel 24 and drum 25, thereby winding the cable onto the drum 25 and thus pulling the conveyer rearwardly. This rearward motion continues until the supply of electrical energy to the coil 13 is stopped, by the re-opening of the contact *h* which results in the core 15 sliding out of the coil 13 and thus disengaging the clutch member 20 from its fellow member 22. The supply of electrical energy to the motor *c* is carried by lines 27.

For the operation of the reversible motor *m* and gear for the lateral movement of the conveyer a supply of current is taken by lines 28 from the box 11 as shown in Fig. 1. The motor *n* may be automatically reversed by any mechanism commonly used for this purpose.

It will be understood that, through intermediate gear-mechanism, shafts and contacts and adjunctive parts, as contemplated in the constructing of the motor, basis for which is laid in the original specification, co-operation is effected between the spindle 48 and said motor, whereby, as the direction of the latter is reversed, reverse rotation of said spindle results.

The action of the switch is the equivalent of an ordinary rocking switch such as are used with reversing electric motors and any suitable switch may be employed and be driven from the motor for the purpose of reversing the direction of current to the motor. The operation is substantially as follows:—

The coal or other material is delivered in any known or convenient manner onto the conveyers and carried from one to the other, or if the foremost of the conveyers shown in Fig. 1 only is used the material is deposited thereon and delivered over the forward end above the contact switch *h*. The motor *m* having been started swings the other conveyer to and fro and thus spreads delivery of the material. As soon as the pile of deposited material is sufficiently high to push against contact $h$, an electric circuit, not shown, to the clutch $o$ is closed and the clutch winds upon cable $q$ thus drawing back the conveyer until the contacts are again freed. This rearward movement may take place while delivery is proceeding so that the to and fro swinging movement is continuous and the rearward movement is made as soon as the deposited pile is sufficiently high to close the circuit at $h$.

As regards the means for operating the clutch of drum 25 upon which is wound the cable $q$, this is intended as a purely conventional showing of any suitable electrically controlled clutch operation mechanism.

What I claim and desire to secure by Letters Patent is:—

1. A conveyer comprising a frame, pulleys mounted on the frame; an endless belt over the pulleys; and electric clutch carried by the frame; an electric motor and connections for driving one of the pulleys and the clutch; a winding drum connected with the clutch; a switch also carried by the frame to supply electric energy to the clutch; a beam; wheeled hangers for supporting the conveyer from the beam; a cable connected to said winding drum, to pull the conveyer along the beam.

2. A conveyer comprising a frame carrying an endless belt; pulleys, a clutch and an electric motor, in combination with a beam and means for movably supporting the conveyer from said beam, and with means for automatically moving the conveyer rearwardly.

3. A conveyer; a belt carried thereby; an electric motor for driving the belt; in combination with electrical means for rearwardly moving the conveyer, said means comprising an electric clutch and a circuit-closer in circuit therewith and operable by pressure of the material deposited by said conveyer.

4. A conveyer comprising a frame, a girder for supporting the frame; clamping devices for attaching the girder to a support; supporting devices for connecting the frame to the girder and movable lengthwise of said girder; pulleys on the frame; a band over said pulleys; a clutch on the frame; a cable to be wound by said clutch; an electric motor, carried by the frame, to rotate one of said pulleys and drive the band, and to drive the clutch; a normally open electric contact carried by the frame and in circuit with means for controlling the clutch.

5. In combination, a beam; a conveyer having detachable means for hanging the conveyer from the beam; an electric motor and connections, including a winding gear, for shifting the conveyer lengthwise of the beam; and a normally open electric contact for controlling the circuit of the second-mentioned electric motor.

6. In combination, with a band conveyer movable lengthwise of a support, of a winding gear to effect the lengthwise movement, an electric motor carried by the conveyer and connected with said winding gear, and a normally open circuit-closer in circuit with said electric motor and adapted to be closed by the pressure of material deposited by the conveyer.

7. A self-contained electric conveyer, a hanging support therefor, for moving the conveyer laterally, a winding gear for moving the conveyer in a lengthwise direction, an electric motor for operating said winding gear, and a normally open electric contact in circuit with the second-mentioned electric motor and adapted to be closed by the pressure of material deposited by the conveyer.

In witness whereof I have hereunto set my hand in presence of two witnesses.

GEORGE JONES.

Witnesses:
 BARBARA BROOM,
 HENRY FAIRBROTHER.